(12) United States Patent
Maier

(10) Patent No.: US 10,267,234 B2
(45) Date of Patent: Apr. 23, 2019

(54) MOTIVE AIR CONDITIONING SYSTEM FOR GAS TURBINES

(71) Applicant: Dresser-Rand Company, Olean, NY (US)

(72) Inventor: William C. Maier, Almond, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 315 days.

(21) Appl. No.: 15/192,224

(22) Filed: Jun. 24, 2016

(65) Prior Publication Data
US 2017/0009654 A1    Jan. 12, 2017

Related U.S. Application Data

(60) Provisional application No. 62/188,890, filed on Jul. 6, 2015.

(51) Int. Cl.
| | |
|---|---|
| *B01D 50/00* | (2006.01) |
| *B01D 46/00* | (2006.01) |
| *F02C 7/18* | (2006.01) |
| *F01D 25/30* | (2006.01) |
| *F02C 7/055* | (2006.01) |

(52) U.S. Cl.
CPC ............... *F02C 7/18* (2013.01); *F01D 25/30* (2013.01); *F02C 7/055* (2013.01); *B01D 50/002* (2013.01); *F05D 2240/129* (2013.01); *F05D 2260/605* (2013.01); *F05D 2260/608* (2013.01)

(58) Field of Classification Search
CPC ..... B01D 50/002; B01D 46/0068; F02C 7/05; F02C 7/052; F02C 1/005; F01D 5/081; F15D 1/04

USPC .......... 55/306, 385.7, 392; 138/37; 181/210; 95/273

See application file for complete search history.

(56) References Cited

U.S. PATENT DOCUMENTS

| | | | | |
|---|---|---|---|---|
| 2,662,553 | A * | 12/1953 | Dimmock | F15D 1/04 138/37 |
| 3,815,342 | A | 6/1974 | Watts | |
| 3,897,721 | A * | 8/1975 | Fuhst | B08B 15/023 454/59 |
| 4,050,913 | A * | 9/1977 | Roach | B01D 50/002 181/210 |
| 4,515,609 | A | 5/1985 | Cuvelier | |
| 5,560,195 | A | 10/1996 | Anderson et al. | |
| 6,260,658 | B1 | 7/2001 | Darrell et al. | |
| 7,137,241 | B2 | 11/2006 | Martling et al. | |
| 7,601,193 | B2 * | 10/2009 | Scherrer | B01D 45/08 55/440 |
| 7,658,061 | B2 * | 2/2010 | Kawamoto | F02C 7/05 55/306 |
| 8,397,484 | B2 * | 3/2013 | Draper | F02C 1/005 55/385.7 |

(Continued)

*Primary Examiner* — Duane Smith
*Assistant Examiner* — Minh Chau T Pham

(57) ABSTRACT

A motive air conditioning system for a gas turbine assembly is provided. The motive air conditioning system may include an inlet flow channel configured to be fluidly coupled with the gas turbine assembly. The motive air conditioning system may also include a filtration assembly fluidly coupled with the inlet flow channel and configured to filter motive air. The filtration assembly may include a plurality of filter modules disposed adjacent one another and further disposed circumferentially about a longitudinal axis of the inlet flow channel.

18 Claims, 7 Drawing Sheets

(56) References Cited

U.S. PATENT DOCUMENTS

| | | | |
|---|---|---|---|
| 9,157,367 B2* | 10/2015 | Herrera | F02C 7/05 |
| 2006/0112825 A1* | 6/2006 | Renwart | B01D 46/0068 |
| | | | 95/273 |
| 2008/0173276 A1 | 7/2008 | Barnard | |
| 2009/0020011 A1* | 1/2009 | Gregg | B01D 46/0043 |
| | | | 95/268 |
| 2011/0209622 A1 | 9/2011 | Hines | |
| 2011/0290116 A1 | 12/2011 | Jarrier | |
| 2012/0204525 A1* | 8/2012 | Jarrier | F02C 7/052 |
| | | | 55/385.7 |
| 2013/0092798 A1 | 4/2013 | Boyce | |
| 2013/0139516 A1 | 6/2013 | Viti et al. | |
| 2014/0137524 A1 | 5/2014 | Jarrier | |
| 2015/0377133 A1* | 12/2015 | Kanebako | F02C 3/30 |
| | | | 60/39.54 |
| 2016/0045923 A1* | 2/2016 | Correia | F01D 5/081 |
| | | | 55/392 |
| 2016/0090948 A1* | 3/2016 | Svihla | F02M 35/10157 |
| | | | 105/62.1 |

\* cited by examiner

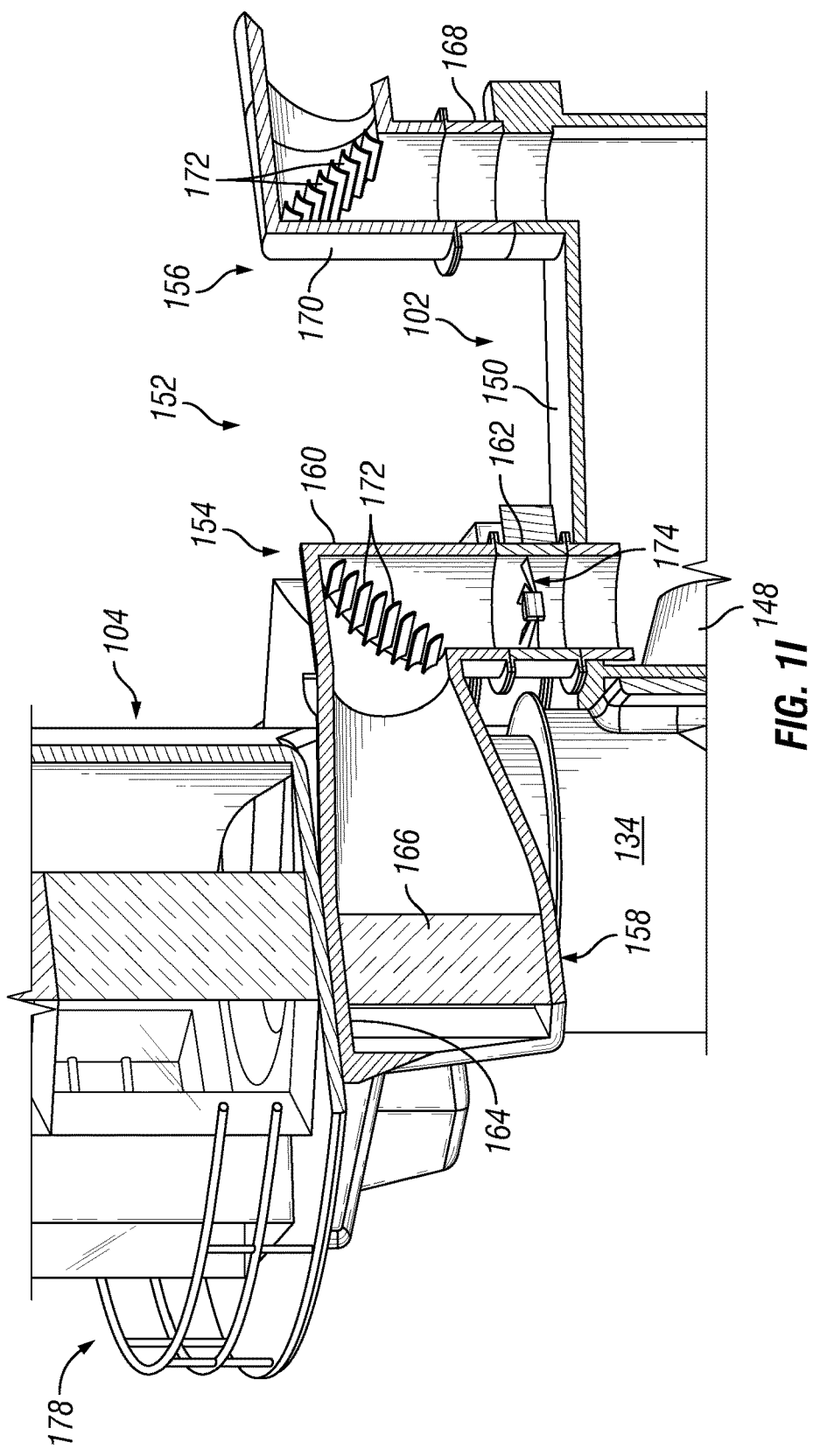

MOTIVE AIR CONDITIONING SYSTEM FOR GAS TURBINES

CROSS REFERENCE TO RELATED APPLICATIONS

This application claims the benefit of U.S. Provisional Patent Application having Ser. No. 62/188,890, which was filed Jul. 6, 2015. The aforementioned patent application is hereby incorporated by reference in its entirety into the present application to the extent consistent with the present application.

BACKGROUND

Reliable and efficient gas turbines have been developed and are utilized in a myriad of industrial processes to drive process equipment (e.g., compressors, pumps, etc.). Gas turbines may also be utilized to drive generators to provide a local source of electricity. To drive the process equipment and/or the generators, gas turbines may receive and compress motive air in a compressor, combust the compressed motive air with fuel in a combustor, and expand the combusted motive air through a turbine. Operational efficiencies of the gas turbine may often be determined, at least in part, by one or more properties of the motive air delivered thereto. Accordingly, gas turbines may often be operated in conjunction with a motive air conditioning system (MACS) configured to control the one or more properties (e.g., temperature, humidity, acoustics, cleanliness, etc.) of the motive air.

Conventional MACS may often include a filtration system to filter the motive air, a ducting system to guide the motive air to the gas turbine, and a means for acoustic treatment to attenuate sound or sound waves generated in the MACS. While conventional MACS may be adequate in controlling the properties of the motive air, the design of the MACS may limit its application in process sites having constrained spaces (e.g., off-shore oil production sites). For example, conventional MACS often utilize crude, simple shaped passages for the ducting system that require relatively larger ducting structures with increased flow areas to limit fluid pressure losses. In addition to the foregoing, separate structural supports (e.g., beams) may often be require to reinforce the MACS and the relatively larger ducting thereof. The utilization of the structural supports may often require many on-site adjustments during installation and maintenance of the MACS, which may often lead to misalignment between the MACS and the gas turbine, thereby increasing fluid pressure losses and decreasing efficiencies.

What is needed, then, is an improved motive air conditioning system for a gas turbine.

SUMMARY

Embodiments of the disclosure may provide a motive air conditioning system for a gas turbine assembly. The motive air conditioning system may include an inlet flow channel configured to be fluidly coupled with the gas turbine assembly. The motive air conditioning system may also include a filtration assembly fluidly coupled with the inlet flow channel and configured to filter motive air. The filtration assembly may include a plurality of filter modules disposed adjacent one another and further disposed circumferentially about a longitudinal axis of the inlet flow channel.

Embodiments of the disclosure may also provide a motive air conditioning system for a gas turbine including an inlet flow channel, a filtration assembly configured to filter motive air, and a ventilation system. The inlet flow channel may be configured to be fluidly coupled with the gas turbine assembly. The filtration assembly may be fluidly coupled with the inlet flow channel and aligned with a longitudinal axis of the inlet flow channel. The ventilation system may include a blower configured to direct ventilation air at least partially through an enclosure of the gas turbine assembly.

Embodiments of the disclosure may further provide a motive air conditioning system including an inlet flow channel configured to be fluidly coupled with a gas turbine assembly, a filtration assembly configured to filter motive air and direct the motive air to the inlet flow channel, and a ventilation system configured to be fluidly coupled with an enclosure of the gas turbine assembly. The inlet flow channel may include a vertically oriented annular duct and an elbow fluidly coupled with the annular duct. The vertically oriented annular duct may be configured to receive the motive air, and the elbow may be configured to turn the motive air from the annular duct toward an axial inlet nozzle of the gas turbine assembly. The filtration assembly may be fluidly coupled with the annular duct and may include a plurality of filter modules disposed adjacent one another and arranged circumferentially about a longitudinal axis of the annular duct. The ventilation system may be configured to direct ventilation air into and out of the enclosure.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 1I illustrates a cross-sectional perspective view of an exemplary venting system of the MACS of FIG. 1A, according to one or more embodiments disclosed.

DETAILED DESCRIPTION

Figure 1A:
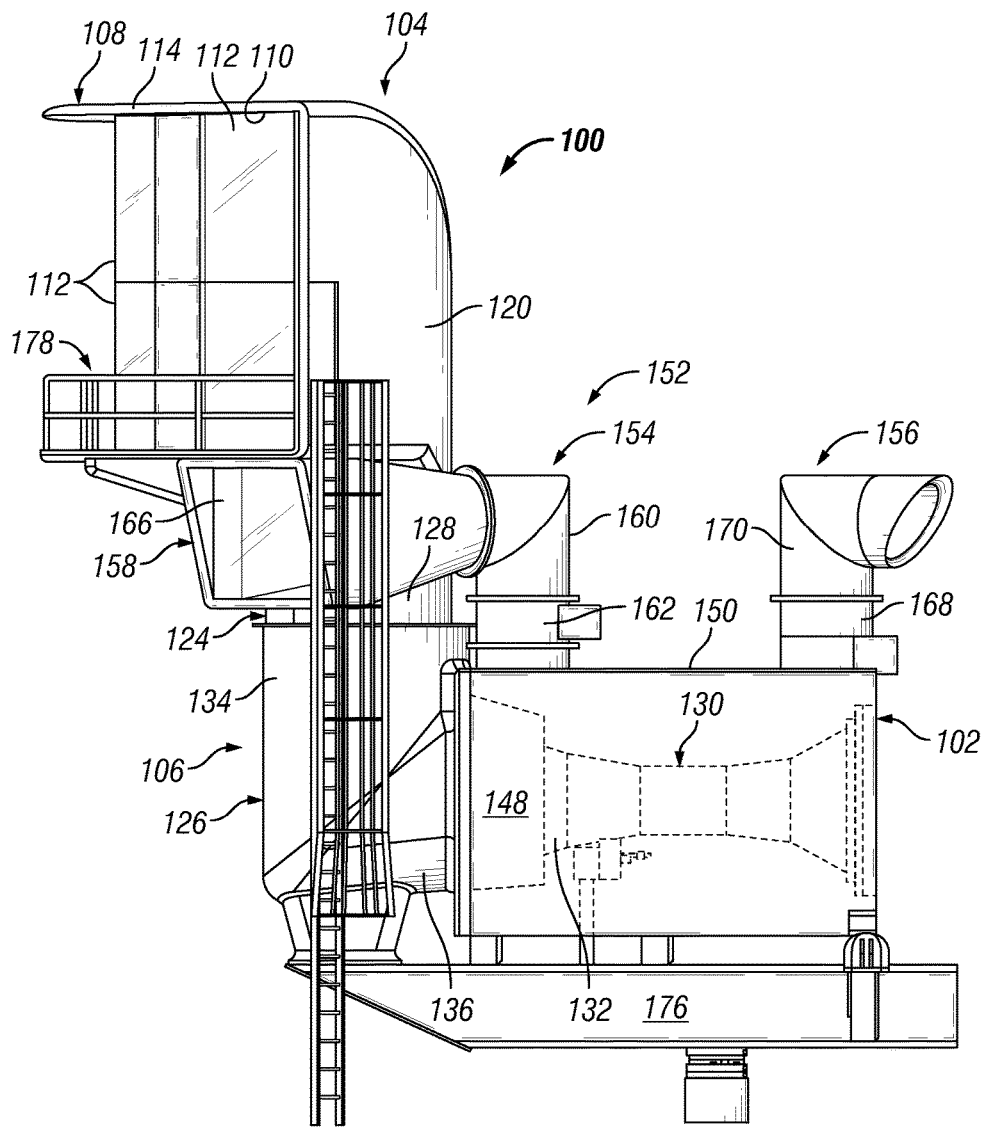
FIG. 1A illustrates a side view of an exemplary motive air conditioning system (MACS) operatively coupled with a gas turbine assembly, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1B:
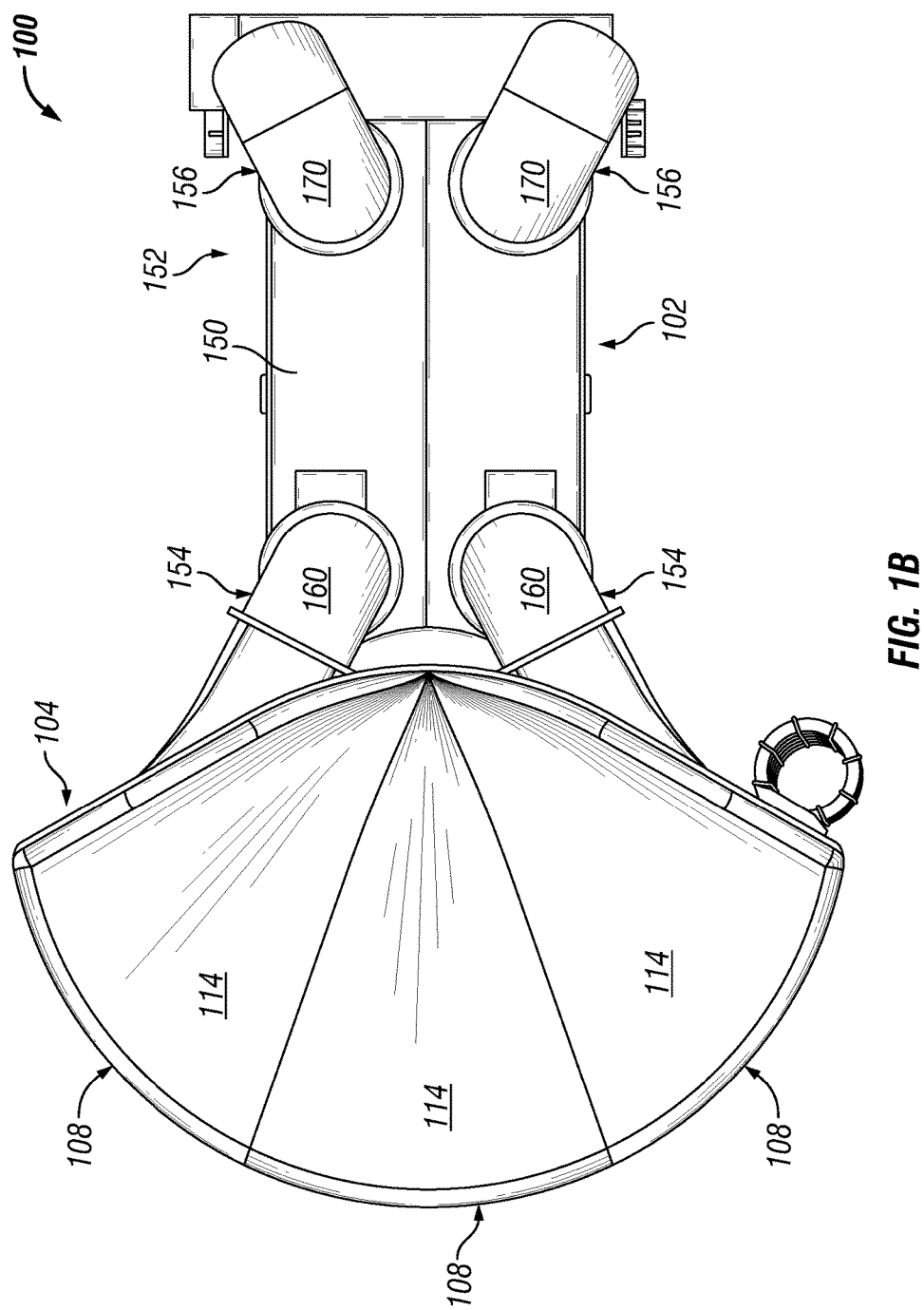
FIG. 1B illustrates an overhead view of the MACS of FIG. 1A, according to one or more embodiments disclosed.
Figure 1C:
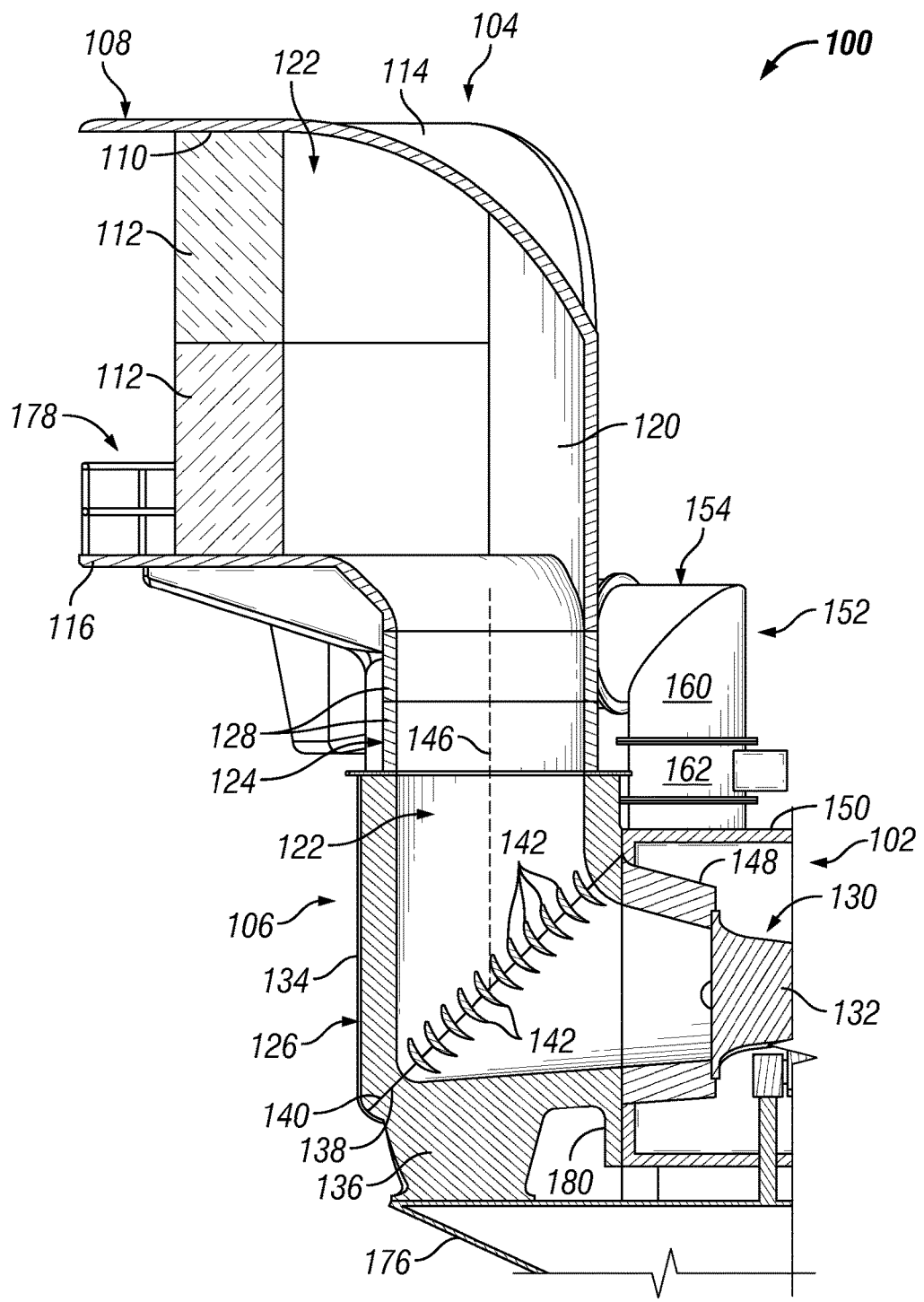
FIG. 1C illustrates a partial cross-sectional view of an exemplary filtration assembly and an inlet flow channel of the MACS of FIG. 1A, according to one or more embodiments disclosed.

FIGS. 1A and 1B illustrate a side view and an overhead view, respectively, of an exemplary motive air conditioning system (MACS) 100 operatively coupled with a gas turbine assembly 102, according to one or more embodiments. FIG. 1C illustrates a partial cross-sectional view of the MACS 100, according to one or more embodiments. The MACS 100 may be configured to condition or regulate one or more properties of motive air utilized in the gas turbine assembly 102. For example, the MACS 100 may be configured to regulate or control the temperature, humidity, acoustics, purity, composition, flow, or the like, of the motive air utilized in the gas turbine assembly 102. As illustrated in FIG. 1A and further illustrated in detail in FIG. 1C, the MACS 100 may include a filtration assembly 104 and an inlet flow channel 106 disposed adjacent and fluidly coupled with one another.

Figure 1D:
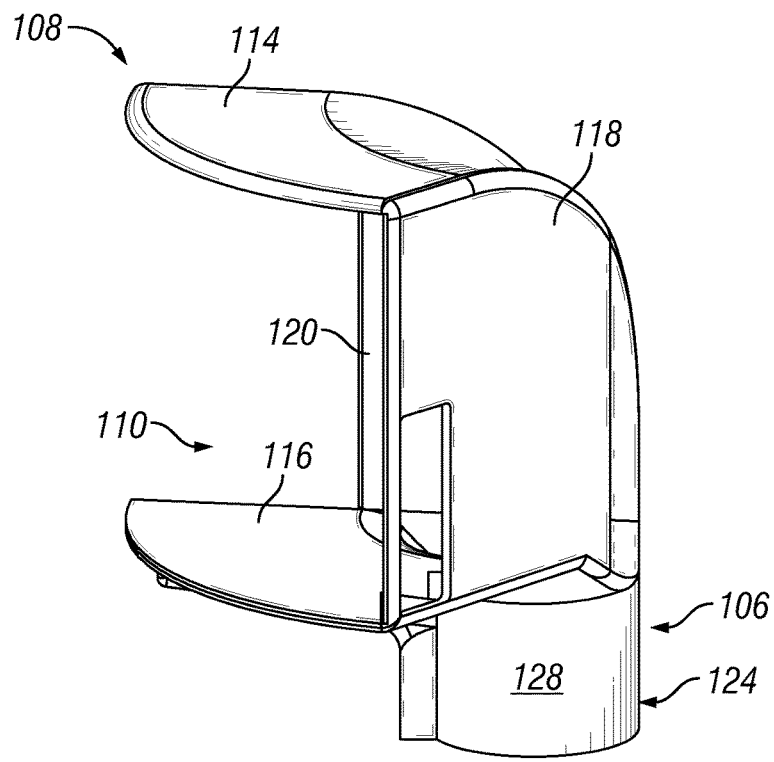
FIG. 1D illustrates a perspective view of an exemplary filter module of the filtration assembly of FIG. 1C, according to one or more embodiments disclosed.
Figure 1E:
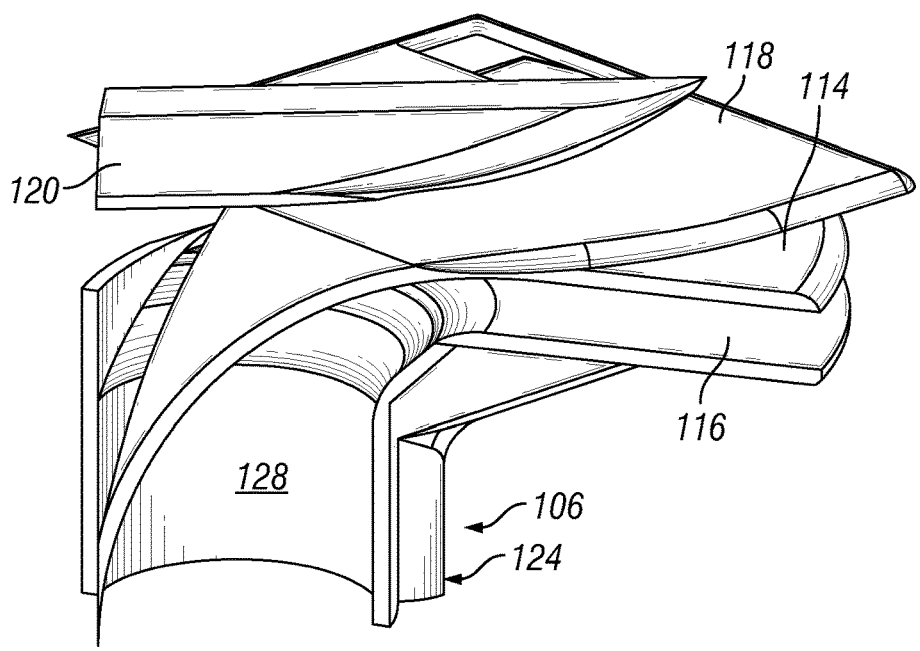
FIG. 1E illustrates a perspective view of the filter module of FIG. 1D in a disassembled state, according to one or more embodiments disclosed.

As illustrated in FIG. 1B, the filtration assembly 104 may include one or more filter housings or modules 108 (three are shown) configured to filter motive air directed to the gas turbine assembly 102. The filter modules 108 may be disposed adjacent one another or spaced from one another. For example, as illustrated in FIG. 1B, the filter modules 108 may be disposed adjacent one another and arranged circumferentially about an axis 146 (see FIG. 1C) of the inlet flow channel 106. As illustrated in FIG. 1C, each filter module 108 may define at least one opening or inlet 110 configured to receive a filter 112. Referring briefly to FIG. 1D, each of the filter modules 108 may be fabricated or assembled from an upper endwall 114, a lower endwall 116, and one or more sidewall panels 118, 120. The upper and lower endwalls 114, 116 and the sidewall panels 118, 120 may be coupled with one another via one or more mechanical fasteners (not shown) to define the inlet 110 and a portion of a pathway 122 (see FIG. 1C) extending through the MACS 100. At least a portion of the upper endwall 114 and/or the lower endwall 116 may be shaped to provide a smooth or gradual transition for at least a portion of the pathway 122 extending from the respective inlets 110 of the filter modules 108 to the inlet flow channel 106. For example, as illustrated in FIG. 1C, at least a portion of the upper and lower endwalls 114, 116 may be curved or arcuate to provide the pathway 122 with a smooth transition from the respective inlets 110 of the filter modules 108 to the inlet flow channel 106. In at least one embodiment, each of the filter modules 108 may be disassembled or decomposed to facilitate the storage and/or transport of the MACS 100. For example, as illustrated in FIG. 1E, the respective upper and lower endwalls 114, 116 and the respective sidewall panels 118, 120 of the filter modules 108 may be stacked upon one another to facilitate the storage and/or transport of the MACS 100.

The inlet flow channel 106 may be fluidly coupled with the filter modules 108 of the filtration assembly 104 and configured to direct the motive air from the filter modules 108 to the gas turbine assembly 102. The inlet flow channel 106 may include a vertical or substantially vertical section 124 fluidly coupled with the filter modules 108 of the filtration assembly 104, and an elbow or turn 126 fluidly coupled with the vertical section 124. The vertical section 124 may be configured to direct the motive air from the filter modules 108 of the filtration assembly 104 to the elbow 126, and the elbow 126 may be configured to direct the motive air from the vertical section 124 to the gas turbine assembly 102. For example, the vertical section 124 and the elbow 126 may define a portion of the pathway 122 extending from the filtration assembly 104 to the gas turbine assembly 102.

The vertical section 124 of the inlet flow channel 106 may at least partially determine a height or length of the inlet flow channel 106 and a vertical position of the filtration assembly 104. For example, the vertical section 124 may include one or more annular ducts 128 (two are shown) configured to at least partially determine the height of the inlet flow channel 106. The annular ducts 128 may have any suitable shape and/or size capable of directing a sufficient amount or mass flow of motive air from the filtration assembly 104 to the gas turbine assembly 102. For example, each of the annular ducts 128 may be cylindrical, prismatic, elliptical, or the like. In an exemplary embodiment, illustrated in FIG. 1C, the annular ducts 128 are generally cylindrical.

The elbow 126 of the inlet flow channel 106 may be configured to turn the motive air from the vertical section 124 toward a gas turbine 130 (see FIGS. 1A and 1C) of the gas turbine assembly 102. For example, as illustrated in FIG. 1C, the elbow 126 may be configured to turn the motive air from the vertical section 124 toward an inlet nozzle 132 (e.g., horizontal inlet nozzle) of the gas turbine 130. The elbow 126 may have any suitable shape, size, and/or turning angle capable of turning the motive air from the vertical section 124 toward the inlet nozzle 132 of the gas turbine 130. For example, a cross-section of the elbow 126 may be cylindrical, rectilinear, prismatic, elliptical, or the like. In another example, the elbow 126 may have a turning angle greater than 90 degrees (°), less than 90°, or about 90°. In an exemplary embodiment, illustrated in FIG. 1C, the turning angle of the elbow 126 is about 90°. The elbow 126 may be assembled, formed, or otherwise fabricated with one or more miter joints. For example, separate sections 134, 136 (e.g., pipe sections) may be coupled with one another at respective ends 138, 140 thereof via a miter joint to fabricate the elbow 126.

A plurality of vanes 142 may be disposed in the inlet flow channel 106 and configured to condition the motive air flowing therethrough. In at least one embodiment, the plurality of vanes 142 may be disposed in the inlet flow channel 106 and configured to attenuate the generation and/or proliferation of sound or sound waves produced by the motive air flowing therethrough. For example, each of the vanes 142 may include a perforated, rigid outer shell (not shown) encapsulating a sound insulating or attenuating material. The sound attenuating material may include, but is not limited to, fiberglass, mineral wool, one or more polymers, steel wool, or any acoustically treated media. In another embodiment, the plurality of vanes 142 may be disposed in the inlet flow channel 106 to condition the motive air to achieve predetermined or desired fluid properties and/or fluid flow attributes. For example, the plurality of vanes 142 may be configured to control or regulate the velocity, flow rate, pressure, and/or any other suitable fluid properties and/or fluid flow attributes of the motive air flowing through the inlet flow channel 106. In another example, the plurality of vanes 142 may be configured to minimize or reduce pressure losses and/or maintain uniform or substantially uniform flow distribution of the motive air through the inlet flow channel 106. In another example, illustrated in FIG. 1C and further illustrated in detail in FIG. 1F, the plurality of vanes 142 may be disposed in the elbow 126 and configured to at least partially turn the motive air from the vertical section 124 toward the inlet nozzle 132 of the gas turbine 130.

Figure 1F:
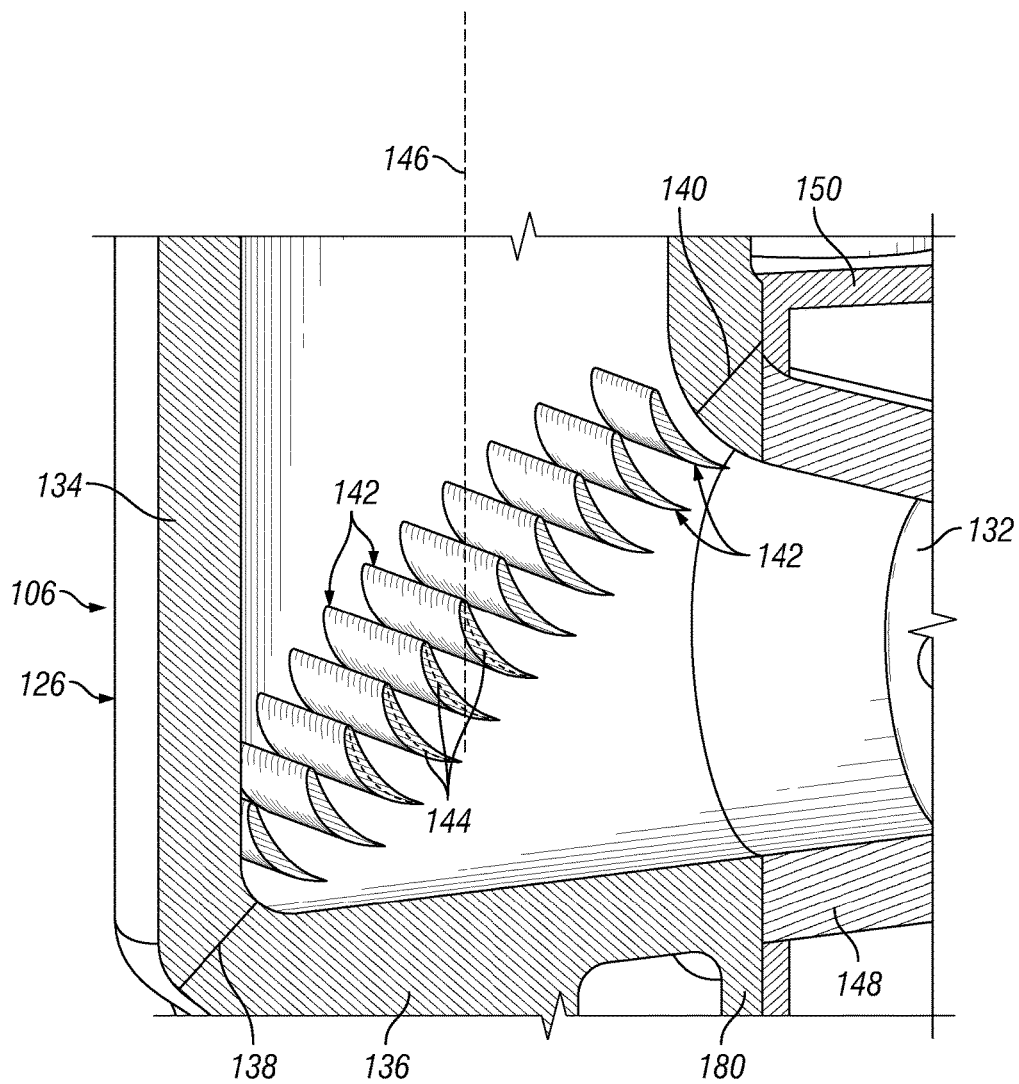
FIG. 1F illustrates a cutaway perspective view of an exemplary elbow of the inlet flow channel of FIG. 1C, according to one or more embodiments disclosed.

The plurality of vanes 142 may be shaped to at least partially condition the motive air flowing through the inlet flow channel 106. For example, the plurality of vanes 142 may be airfoil shaped, streamline shaped, or shaped otherwise to at least partially condition the motive air flowing through the inlet flow channel 106. In an exemplary embodiment, illustrated in FIG. 1F, the plurality of vanes 142 are airfoil shaped. For example, the airfoil shapes of the plurality of vanes 142 may be based on or substantially similar to the National Advisory Committee for Aeronautics (NACA) 65 series airfoil shape or the like. As further illustrated in FIG. 1F, respective mean camber lines 144 of the plurality of vanes 142 may be arcuate or curved to facilitate the turning of the motive air toward the inlet nozzle 132 of the gas turbine 130. While FIG. 1F illustrates the plurality of vanes 142 as having arcuate mean camber lines 144, it should be appreciated that the respective camber lines 144 may also be straight. In at least one embodiment, a chord length and/or a pitch to chord ratio of each of the vanes 142 may be varied (i.e., increased or decreased) to control or regulate the attenuation of the sound waves and/or control pressure flow through the inlet flow channel 106.

In at least one embodiment, an orientation and/or arrangement of the plurality of vanes 142 may also be varied and/or controlled to at least partially condition the motive air flowing through the inlet flow channel 106. For example, the plurality of vanes 142 may be tilted, pitched, cambered, or otherwise angled relative to the axis 146 (see FIG. 1C) of the inlet flow channel 106 or a component thereof. For example, as illustrated in FIG. 1C, the plurality of vanes 142 may be angled relative to a longitudinal axis 146 of the vertical section 124 of the inlet flow channel 106 to turn the motive air toward the inlet nozzle 132 of the gas turbine 130. In at least one embodiment, illustrated in FIGS. 1C and 1F, the plurality of vanes 142 may be aligned with one another in a single, common row. In another embodiment, the plurality of vanes 142 may be arranged as a plurality of rows, where the vanes 142 in one of the rows may be staggered or offset with respect to the vanes 142 in an adjacent row. In yet another embodiment, the plurality of vanes 142 may be arranged as a plurality of rows, where the vanes 142 in one of the rows may be aligned with the vanes 142 in an adjacent row. The plurality of vanes 142 may be spaced from one another at substantially equal intervals or at varying intervals.

Figure 1H:
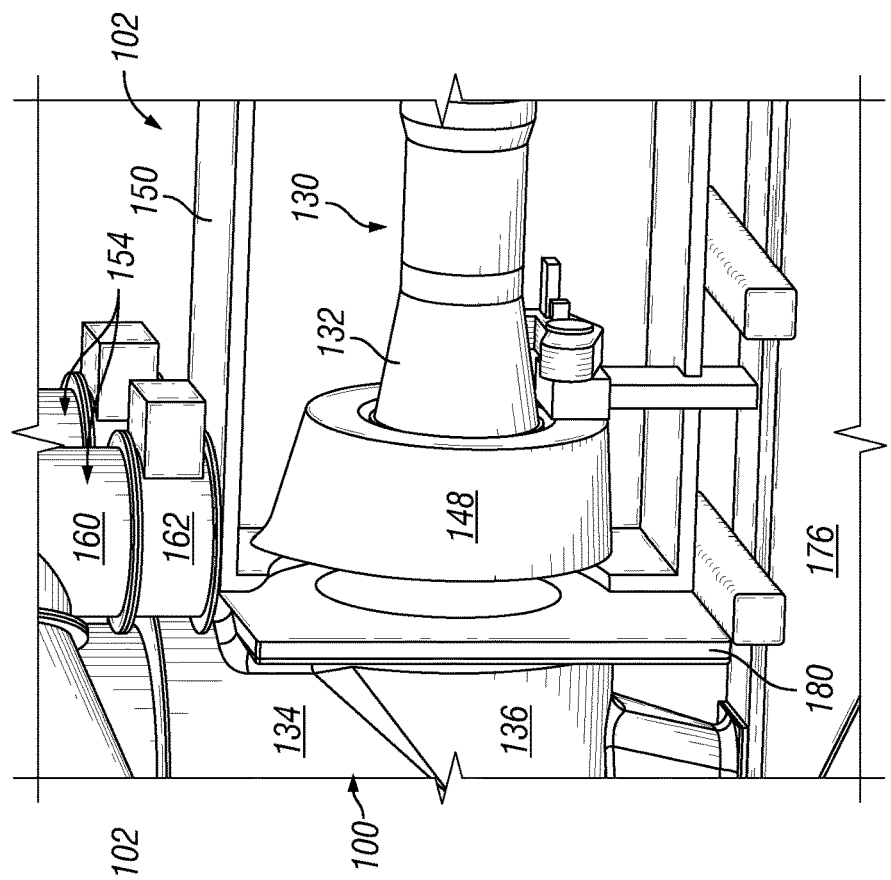
FIG. 1H illustrates a partial cutaway view of the MACS with the mating ring and the gas turbine assembly of FIG. 1A disassembled from one another, according to one or more embodiments disclosed.
Figure 1G:
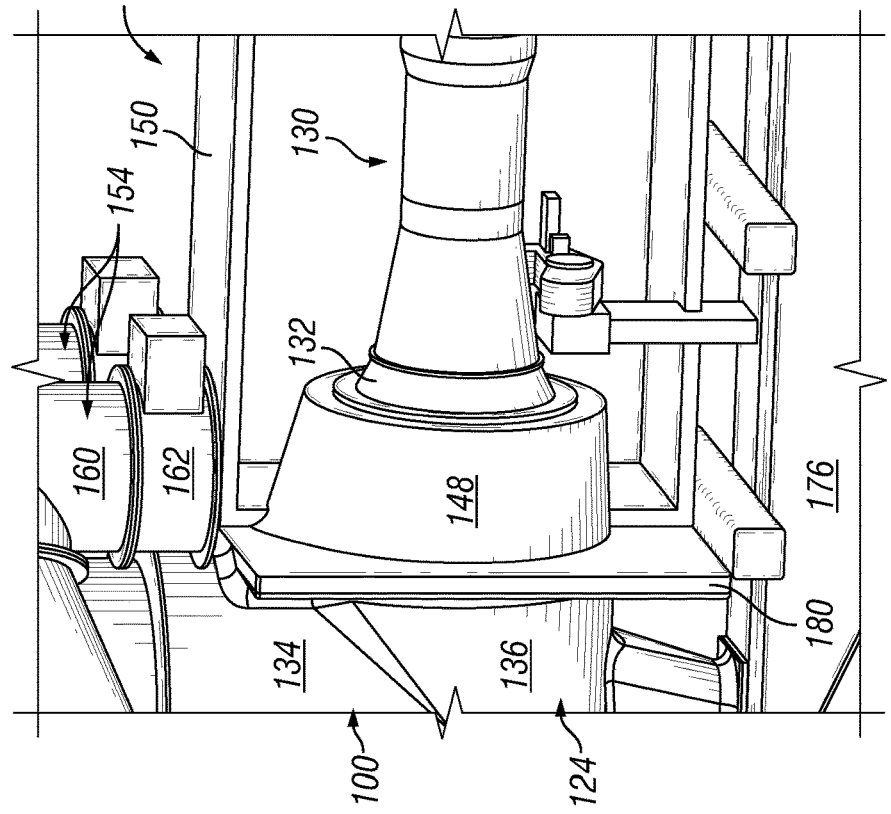
FIG. 1G illustrates a partial cutaway view of the MACS and the gas turbine assembly of FIG. 1A coupled with one another via a mating ring, according to one or more embodiments disclosed.

The inlet flow channel 106 may be operatively coupled with the gas turbine 130. For example, as illustrated in FIG. 1C and further illustrated in detail in FIGS. 1G and 1H, the elbow 126 of the inlet flow channel 106 may be fluidly coupled with the inlet nozzle 132 of the gas turbine 130. In another example, a horizontal section (not shown) fabricated from one or more annular ducts, similar to the annular ducts 128 of the vertical section 124, may be interposed between the elbow 126 and the inlet nozzle 132, and configured to fluidly couple the elbow 126 with the inlet nozzle 132. In an exemplary embodiment, the inlet flow channel 106 may be coupled or secured with the gas turbine 130 via a mating ring 148. For example, as illustrated in FIG. 1C and further illustrated in detail in FIGS. 1G and 1H, the mating ring 148 may couple the inlet flow channel 106 with the inlet nozzle 132 of the gas turbine 130. As further illustrated in FIGS. 1G and 1H, the mating ring 148 of the inlet flow channel 106 may be at least partially disposed in an enclosure or housing 150 of the gas turbine assembly 102. The mating ring 148 may be configured to secure, mount, or otherwise couple the gas turbine 130 with the inlet flow channel 106 via one or more mechanical fasteners (not shown). A seal or membrane (not shown) may be utilized at an interface between the elbow 126 and the inlet nozzle 132 of the gas turbine 130 to provide an air-tight seal therebetween. For example, an annular flexible membrane may be disposed at the interface between the elbow 126 and the inlet nozzle 132 to prevent leakage of the motive air from the inlet flow channel 106. The mating ring 148 may be configured to be urged or translated away from the elbow 126 to uncouple or dismount the MACS 100 from the gas turbine assembly 102 to facilitate installation, service, and/or maintenance of the MACS 100 and/or the gas turbine assembly 102. For example, as illustrated in FIGS. 1G and 1H, the mating ring 148 may be translated axially away from or toward the elbow 126 to facilitate maintenance of the MACS 100 and/or the gas turbine assembly 102.

As illustrated in FIG. 1A and further illustrated in detail in FIG. 1I, the MACS 100 may include a ventilation system 152 configured to ventilate the enclosure 150 of the gas turbine assembly 102. As illustrated in FIG. 1I, the ventilation system 152 may include one or more intake ducts 154 and one or more exhaust ducts 156 in fluid communication with an interior of the enclosure 150. The intake duct 154 may be configured to receive ventilation air, filter the ventilation air, and direct the ventilation air to the interior of the enclosure 150. The exhaust duct 156 may be configured to discharge the ventilation air from the interior of the enclosure 150 to the atmosphere or an exhaust stack (not shown).

Referring to FIGS. 1A and 1I, the intake duct 154 may include an intake filter module 158, an elbow or turn 160, and/or an annular duct 162 coupled with one another. The intake filter module 158 may be configured to at least partially filter the ventilation air. For example, the intake filter module 158 may define at least one opening or inlet 164 and a filter 166 may be disposed in the inlet 164 to at least partially filter the ventilation air. The intake filter module 158 may be disposed near or adjacent the filtration assembly 104. For example, as illustrated in FIG. 1A, the intake filter module 158 may be disposed below the filter modules 108 of the filtration assembly 104. As further illustrated in FIGS. 1A and 1I, the intake filter modules 158 may be horizontally oriented. While FIGS. 1A and 1I illustrate the intake filter modules 158 in a horizontal orientation, it should be appreciated that the intake filter modules 158 may be oriented in any direction. For example, the intake filter modules 158 may be oriented in a vertical direction. The elbow 160 may be fluidly coupled with the intake filter module 158 and configured to turn the ventilation air toward the enclosure 150 of the gas turbine assembly 102. The elbow 160, similar to the elbow 126 of the inlet flow channel 106, may be assembled, formed, or otherwise fabricated with one or more miter joints. It should be appreciated that, in at least one embodiment, the intake duct 154 may not include the elbow 160. For example, the elbow 160 may be omitted in an embodiment where the intake filter module 158 is oriented in a vertical or substantially vertical direction. The annular duct 162 may be fluidly coupled with the elbow 160 and the enclosure 150, and configured to direct the filtered ventilation air from the elbow 160 to the interior of the enclosure 150. The exhaust duct 156 may include an annular duct 168 and/or an elbow 170. It should be appreciated that the annular duct 168 and the elbow 170 of the exhaust duct 156 may be similar to the annular duct 162 and the elbow 160 of the intake duct 154. In an exemplary embodiment, illustrated in FIG. 1I, the ventilation system 152 may include a plurality of vanes 172 disposed in one or more of the elbows 160, 170, and configured to turn the ventilation air flowing therethrough. Additionally, one or more portions of the intake duct 154 and/or the exhaust duct 156, such as the respective elbows 160, 170 thereof, may be configured with appropriate acoustic design of the outer housing in conjunction with specially constructed vanes 172 similar to the vanes 142 of the MACS 100 specifically to attenuate noise projection from the enclosure 150 through the intake and exhaust ducts 154 or 156.

The ventilation system 152 may include one or more fans or blowers 174 (one is shown) configured to direct the ventilation air into and/or drive the ventilation air out of the enclosure 150. In at least one embodiment, the fan 174 may be disposed in the exhaust duct 156 and configured to discharge or withdrawal the ventilation air from the enclosure 150. In another embodiment, illustrated in FIG. 1I, the fan 174 may be disposed in the annular duct 162 of the intake duct 154 and configured to drive the ventilation air through the filter 166 of the intake filter module 158 and into the enclosure 150. It should be appreciated that the fan 174 may be disposed at any point along the intake duct 154 and/or the exhaust duct 156 of the ventilation system 152. For example, the fan 174 may be disposed in the intake filter module 158 of the intake duct 154 and/or in the annular duct 168 of the exhaust duct 170. A non-return damper (not shown) and/or a fire stop damper (not shown) may also be placed in one or more portions of the ventilation system 152 for enhanced reliability and safety of the system. For example, the non-return damper and/or the fire stop damper may be disposed in one or more of the intake ducts 154, the exhaust ducts 156, and/or the annular ducts 162, 168.

In an exemplary embodiment, one or more components or portions of the MACS 100 may be fabricated or manufactured from a rigid, relatively light-weight material, such as a fiber reinforced polymer or resin. For example, the upper and lower endwalls 114, 116 and/or the sidewall panels 118, 120 of the filtration assembly 104 may be fabricated from the fiber reinforced polymer. In another example, the elbow 126 and/or the vertical section 124 of the inlet flow channel 106 may be fabricated from the fiber reinforced polymer. Utilizing the rigid, relatively light-weight material may allow the MACS 100 to be self-supporting. Utilizing the rigid, relatively light-weight material may also allow the MACS 100 to be directly mounted to a base 176 (see FIG. 1A) of the gas turbine assembly 102 without any additional support structures.

In at least one embodiment, a walkway or mezzanine 178 may be coupled with and/or supported by the MACS 100. For example, as illustrated in FIG. 1A, the mezzanine 178 may be coupled with the filtration assembly 104 of the MACS 100. The mezzanine 178 may be disposed adjacent the filtration assembly 104 and configured to facilitate service and maintenance of the MACS 100. For example, the mezzanine 178 may extend about at least a portion of the filtration assembly 104 to allow a user or operator to maintain or service the filter modules 108 and/or the respective filters 112 thereof.

In at least one embodiment, one or more components or portions of the MACS 100 may be fabricated from or treated with a sound attenuating material (e.g., fiberglass, mineral wool, etc.). For example, the upper and lower endwalls 114, 116 and/or the sidewall panels 118, 120 of the filtration assembly 104 may be fabricated from or treated with (e.g., coated, layered, etc.) the sound attenuating materials. In another example, the elbow 126 and/or the vertical section 124 of the inlet flow channel 106 may be fabricated from or treated with (e.g., coated, layered, etc.) the sound attenuating materials. In an exemplary embodiment, illustrated in FIGS. 1G and 1H, the inlet flow channel 106 may include a flange 180 fabricated from the fiber reinforced polymer and treated with the sound attenuating materials. The flange 180 may be disposed adjacent the elbow 126, and may form at least a portion of the enclosure 150.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

I claim:

1. A motive air conditioning system for a gas turbine assembly, comprising:
   an inlet flow channel configured to be fluidly coupled with the gas turbine assembly; and
   a filtration assembly fluidly coupled with the inlet flow channel and configured to filter motive air, the filtration assembly comprising a plurality of filter modules disposed adjacent one another and further disposed circumferentially about a longitudinal axis of the inlet flow channel, wherein each fiber module of the plurality of filter modules comprises an upper endwall, a lower endwall, and a plurality of sidewall panels coupled with one another and defining respective inlets for each filter module, and wherein at least a portion of the upper and lower endwalls of each filter module of the plurality of filter modules is configured to define a flow pathway for the motive air extending from the filtration assembly to the gas turbine assembly with a smooth transition from the respective inlets of the plurality of filter modules to the inlet flow channel.

2. The motive air conditioning system of claim 1, wherein at least a portion of the upper endwall is arcuate.

3. The motive air conditioning system of claim 1, wherein at least a portion of the lower endwall is arcuate.

4. The motive air conditioning system of claim 1, wherein the inlet flow channel comprises:
an annular duct fluidly coupled with the filtration assembly and configured to receive the motive air from the filtration assembly, and
an elbow fluidly coupled with the annular duct, the elbow configured to receive the motive air from the annular duct and at least partially turn the motive air toward the gas turbine assembly, and further configured to attenuate the generation of sound to control external sound levels.

5. The motive air conditioning system of claim 4, further comprising a plurality of vanes disposed in the inlet flow channel and configured to condition the motive air flowing therethrough.

6. The motive air conditioning system of claim 5, wherein the plurality of vanes are disposed in the elbow of the inlet flow channel and configured to at least partially turn the motive air from the annular duct toward the gas turbine assembly.

7. The motive air conditioning system of claim 5, wherein the plurality of vanes comprise a sound attenuating material and are configured to attenuate sound waves produced by the motive air flowing through the inlet flow channel.

8. The motive air conditioning system of claim 1, further comprising a mating ring coupled with the inlet flow channel and configured to couple the inlet flow channel with an inlet nozzle of the gas turbine assembly.

9. The motive air conditioning system of claim 8, wherein the mating ring is at least partially disposed in an enclosure of the gas turbine assembly.

10. The motive air conditioning system of claim 1, further comprising a ventilation system configured to ventilate an enclosure of the gas turbine assembly, the ventilation system comprising:
an intake duct configured to receive and filter ventilation air and direct the ventilation air to an interior of the enclosure; and
an exhaust duct configured to discharge the ventilation air from the interior of the enclosure.

11. The motive air conditioning system of claim 10, wherein the ventilation system comprises a fan configured to direct the ventilation air through the intake duct, the exhaust duct, and the enclosure of the gas turbine assembly.

12. The motive air conditioning system of claim 11, wherein the fan is disposed in the intake duct.

13. A motive air conditioning system for a gas turbine assembly, comprising:
an inlet flow channel configured to be fluidly coupled with the gas turbine assembly;
a filtration assembly fluidly coupled with the inlet flow channel and aligned with a longitudinal axis of the inlet flow channel, the filtration assembly being configured to filter motive air,
wherein the filtration assembly comprises a plurality of filter modules disposed adjacent one another and further disposed circumferentially about a longitudinal axis of the inlet flow channel
wherein each filter module of the plurality of filter modules comprises an upper endwall, a lower endwall, and a plurality of sidewall panels coupled with one another and defining respective inlets for each filter module, and
wherein at least a portion of the upper and lower endwalls of each filter module of the plurality of filter modules is configured to define a flow pathway for the motive air extending from the filtration assembly to the gas turbine assembly with a smooth transition from the respective inlets of the plurality of filter modules to the inlet flow channel; and
a ventilation system comprising a blower configured to direct ventilation air at least partially through an enclosure of the gas turbine assembly.

14. The motive air conditioning system of claim 13, wherein the ventilation system further comprises:
an intake duct fluidly coupled with the enclosure and configured to filter the ventilation air and direct the ventilation air into the enclosure; and
an exhaust duct fluidly coupled with the enclosure and configured to discharge the ventilation air from the enclosure.

15. The motive air conditioning system of claim 13, wherein the filtration assembly comprises a plurality of filter modules disposed adjacent one another and further disposed circumferentially about a longitudinal axis of the inlet flow channel.

16. The motive air conditioning system of claim 13, wherein the motive air conditioning system is configured to be directly mounted to a base of the gas turbine assembly.

17. The motive air conditioning system of claim 13, wherein the motive air conditioning system is mounted to the base of the gas turbine assembly without additional support structures.

18. A motive air conditioning system, comprising:
an inlet flow channel configured to be fluidly coupled with a as turbine assembly, the inlet flow channel comprising:
a vertically oriented annular duct configured to receive motive air; and
an elbow fluidly coupled with the annular duct and configured to turn the motive air from the annular duct toward an axial inlet nozzle of the as turbine assembly;
a filtration assembly fluidly coupled with the annular duct and configured to filter the motive air and direct the motive air to the inlet flow channel via a flow pathway extending from the filtration assembly to the gas turbine assembly, the filtration assembly comprising a plurality of filter modules disposed adjacent one another and arranged circumferentially about a longitudinal axis of the annular duct, wherein the flow pathway defines a smooth transition from respective inlets of the plurality of filter modules to the inlet flow channel; and a ventilation system configured to be fluidly coupled with an enclosure of the as turbine assembly, and further configured to direct ventilation air into and out of the enclosure.

* * * * *